3,842,160

PROCESS FOR REDUCING EMISSION OF HYDROGEN SULFIDE WHEN WASHING SULFUR-DIOXIDE-CONTAINING WASTE GASES OBTAINED FROM THE BURNING OF CELLULOSE WASTE LIQUOR

Rolf Carl August Brannland, Husum, Bengt Goran Hultman, Domsjoverken, and Bertil Valdemar Hubert, Krist Inehamn, Sweden, assignors to Mo Och Domsjo Aktiebolag, Ornskoldsvik, Sweden No Drawing. Filed Dec. 29, 1971, Ser. No. 213,837
Int. Cl B01d *53/34*
U.S. Cl. 423—242 12 Claims

ABSTRACT OF THE DISCLOSURE

A process is provided for reducing the emission of hydrogen sulfide when scrubbing sulfur dioxide-containing waste gases obtained from burning waste liquor from cellulose digestion processes with aqueous washing liquor derived from an alkaline waste liquor containing sulfide ion. It has been found that hydrogen sulfide emission is reduced considerably when such aqueous washing liquor has a pH within the range from about 6 to about 7.

The burning of evaporated waste liquor obtained from the digestion of wood in accordance with the sulfite or sulfate cellulose pulping methods in a soda recovery plant releases relatively large quantities of sulfur in the form of sulfur dioxide gas which is entrained in the flue gases and which be be recovered by washing the gases with alkaline aqueous washing liquors in so-called flue gas scrubbing is usually carried out after the gases have been cooled by an indirect cooling process in a waste heat boiler and after they have been freed from dust by a mechanical or electrostatic dust separation device.

U.S. Pat. No. 3,532,595, patented Oct. 6, 1970 to Arnesjo, Brannland, Gyllesten and Sanberg, provides a method for heating water which is sufficiently pure to allow its use in pulp washing and/or pulp bleaching processes, employing the hot waste gases obtained from burning waste liquor from the sulfite or sulfate cellulose pulping process as a source of heat. The waste gases are first purified and then countercurrently contacted with atomized water to heat the water to a temperature greater than about 50° C. In this process, the waste gases, after being heated to a temperature of from 100° to 140° C., and also desirably after being passed through a mechanical or electrostatic dust separation device, are treated in a flue gas scrubber with complete wetting to substantially completely free them of solid particles, sulfur dioxide and hydrogen chloride, by washing with an alkaline aqueous solution having a pH in excess of 7. The solution is made alkaline by the addition of pure alkali, green liquor, white liquor, or sulfide. Thereafter, in one or more subsequent stages, the hot gases are cooled directly by countercurrent contact with water to a temperature of from 5° to 55° C.

The alkaline aqueous washing liquor that is obtained in this process as a result of absorption of sulfur dioxide contains sodium sulfite, arising from reaction of the alkaline sodium hydroxide content of the liquor with the sulfur dioxide gas absorbed in the course of the washing. Also present are sodium carbonate and sodium sulfate, and rather small amounts of sodium thiosulfate and sodium chloride. A typical composition of the liquor is:

| | G. l. |
|---|---|
| $Na_2O$ | 28 |
| $So_3^=$ | 27 |
| $CO_3^=$ | 5 |
| $SO_4^=$ | 9 |
| $S_2O_3^=$ | 2.5 |
| $Cl^-$ | 3.0 |
| $S^=$ | 0.3 |

A problem arises in the application of this process commercially, however, when the alkaline washing liquor is derived from green liquor, white liquor, or other sulfide-containing liquor. As carbon dioxide and sulfur dioxide of the flue gases are absorbed in the washing liquor, alkalinity is reduced and part of the sulfide content of the washing liquor is released as hydrogen sulfide, which is liberated to the atmosphere with the washed flue gases. The quantity of hydrogen sulfide that is thus introduced into the atmosphere depends, among other things, on the pH and sulfide content of the washing solution, and the sulfur dioxide content of the flue gas, which, together with the carbon dioxide, serves as a displacing medium for the sulfide present in the form of hydrogen sulfide. The amount of hydrogen sulfide that is released can be reduced if the sulfide content of the liquor is reduced, or, alternatively, by maintaining the pH at relatively high values, suitably higher than 10, at which pH values the hydrogen sulfide is retained in the liquor in the form of sodium sulfide, there then being sufficient alkali present to capture both the sulfur dioxide and retain the sulfide in solution.

The problem can be avoided by using an absorption liquor which is free from sulfide, but this increases the operating costs of the flue gas scrubber enormously, because either pure alkali has to be used instead of a waste green or white liquor or sulfite-containing liquor, or else the sulfide content of the waste liquor has to be reduced before it can be used for washing purposes. On the other hand, if a highly alkaline liquor is used, having a pH higher than 10, serious complications result because of the accompanying high increase in the absorption of carbon dioxide, which results in an increase in the amount of lime required to causticize the carbonate formed in the absorption liquid. Such carbonate must be precipitated out before the absorption liquid can be used, for example, in a cellulose pulping process. Nonetheless, if it be desired that hydrogen sulfide not be liberated to the atmosphere, it has not been possible to use this process without resorting to one or the other of these undesirable alternatives.

In accordance with the invention, it has been determined, quite unexpectedly, that the emission of hydrogen sulfide can be suppressed substantially completely if the washing liquor has a pH not on the alkaline side but within the range from about 6 to about 7. Under these conditions, hydrogen sulfide is better retained in the washing liquor. Why this is so cannot be explained at the present time. However, it is probable that chemical reactions take place within this pH range that do not take place when the pH is on the alkaline side and that result in retaining the sulfur that might otherwise be liberated as hydrogen sulfide, in some other ionic form, because when such a washing liquor is recirculated, its ability to retain hydrogen sulfide is greatly increased if it be aged for a short time after blending with a fresh sulfide-containing washing liquor while retaining the pH within the range from about 6 to about 7 and before being brought in contact with the flue gases. The significance of the ageing apparently is that a reaction or reactions take place during the ageing which lead to conversion of the newly added sulfide ion present to some other ionic form, possibly thiosulfate, and thus reduce the sulfide available for liberation as hydrogen sulfide.

It is known that the preparation of sodium thiosulfate from sodium sulfide and sulfur dioxide, or from sodium sulfite and hydrogen sulfide, occurs smoothly and almost without separation of sulfur when alkali hydroxide is added initially to the solution in such amount as to lead ultimately to the presence of sodium hydrogen sulfide and sodium hydrosulfite, in the correct proportions. It has been suggested by Bassett and Durrant that the synthesis of thiosulfate involves the consecutive reactions:

(1) $$H_2S+H_2S_2O_5 \rightleftharpoons HO.S.O.S.OH+(OH)_2$$

(2) $$H_2S+(HO)_2S \rightleftharpoons 2S+2H_2O$$

(3) $$S+HS_2O_3 \rightleftharpoons H_2S_2O_3$$

Alkali favors thiosulfate formation in the last reaction. Hence, in alkaline solution both thiosulfate and a mixture of sulfide and sulfite are equally stable. Consequently, synthesis of thiosulfate by this method is not possible except at a pH of approximate neutrality or slightly below. Sulfide and sulfite do not react in alkaline solution. (Mellor, *Inorganic and Theoretical Chemistry*, Vol. X, pp. 516–517).

Accordingly, it is possible that at the 6 to 7 pH range of the washing liquor employed in the instant invention, sulfide and sulfite react with the formation of thiosulfate, and in this way sulfide is retained in the washing liquor in the form of thiosulfate. It is stressed, however, that this reaction mechanism has not been confirmed by experiment or by analysis of the washing liquor before and after contact with the flue gases, and is merely suggested as a possible explanation of the difference noted when the pH is below 7 rather than above 7, as in the process of U.S. Pat. No. 3,532,595. It is also stressed that in the absorption of sulfur dioxide from the flue gases, there is of course no control over the stoichiometric proportions of sulfur dioxide and hydrogen sulfide in the washing liquor, and thus it would have been impossible to predict that such a reaction mechanism could possibly take place in advance of determining by actual trial the superior effectiveness of a washing liquor having a pH below 7. Prior to the instant invention, it was always considered that such washing liquors had to be alkaline, with a pH in excess of 7, in order for them to be effective.

Accordingly, the process of the instant invention reduces hydrogen sulfide emission when scrubbing sulfur dioxide-containing gases obtained from the burning of waste liquor from cellulose pulping processes with aqueous washing liquors derived from alkaline liquors containing sulfide ion, which comprises contacting the sulfur dioxide-containing gases with an aqueous washing liquor having a pH within the range from about 6 to about 7, absorbing sulfur dioxide in such liquor, withdrawing the liquor from such contact, blending alkaline aqueous liquor containing sulfide ion with at least a portion of the withdrawn liquor in an amount to adjust the pH of the blend to within the range from about 6 to about 7, and recirculating the blend for contact with an additional portion of sulfur dioxide-containing gas.

The process of the invention is applicable to inhibit hydrogen sulfide emission from any aqueous washing liquor prepared at least in part from an alkaline aqueous liquor containing sulfide ion. Such alkaline liquors are generally available as waste liquors from semichemical and chemical cellulose pulping processes of the sulfite and sulfate types, and the sulfide is usually present as sodium sulfide $Na_2S$ or sodium hydrosulfide NaHS. Green liquor, white liquor and black liquor are exemplary alkaline waste liquors containing sulfide ion that can be used in the process of the invention. Such liquors are alkaline, but due to the absorption from flue gases of sulfur dioxide and carbon dioxide, they become more acid. Consequently, if the sulfur dioxide- and carbon dixoide-containing liquor is blended with alkaline sulfide ion-containing liquor, and if the proportion of fresh alkaline sulfide liquor is controlled within limits, it is possible to maintain the pH of the blend of recirculated washing liquor and fresh washing liquor within the stated range of from about 6 to about 7. Since the process is normally carried out continuously, there will always be sufficient recirculating acidic washing liquor available for preparation of the blend, except when the process is first started up. When the process is first started up, however, it is possible to acidify the alkaline sulfide liquor, or to use an alkaline sulfide liquor for the first stages of the washing. This liquor will rapidly become acidic, and reach the pH range of from 6 to 7, after which blending with fresh alkaline sulfide liquor can be begun, and continued thereafter in the required proportion during the remainder of the continuous operation. Although some hydrogen sulfide gas may be liberated to the atmosphere during the initial stages, before the pH has dropped below 7, the total amount of hydrogen sulfide liberated over-all is neglible, and therefore this can be disregarded.

Surprisingly, the advantages of the instant invention are not realized when the pH is below about 6. Under such conditions, hydrogen sulfide emission may increase, and the absorption of sulfur dioxide may be reduced. Best results are obtained when the pH of the washing liquor is within the range from about 6.2 to about 6.9. Still more preferably, the pH is within the range from about 6.5 to about 6.8.

It is desirable although not essential that the blend of washing liquor for recirculation with fresh alkaline sulfide liquor be allowed to age for a short time, usually at least two minutes, at a pH within the range from about 6 to about 7, before contact with flue gases. Unknown but perhaps slow chemical reactions appear to take place during this time which are important to minimize hydrogen sulfide emission. The ageing time can extend beyond two minutes, and an extended ageing is in no way critical, since the emission of hydrogen sulfide is apparently not increased on long storage. Normally, the blend will not be aged for longer than 30 minutes, since otherwise unduly large storage vessels and a high investment in storage equipment are required. A suitable ageing time is within the range from about three to about twenty minutes, and the preferred ageing time is from about four to about ten minutes.

In a continuous operation, the desired ageing time can be obtained by blending the recirculating washing liquor with fresh alkaline sulfide liquor, and then passing the resulting blend through a coil, expanded diameter line, reservoir or storage vessel, from which the blend is also continuously withdrawn, the entry rate and the withdrawal rate and the storage volume being such that at the chosen circulation rate, the dwell time of the blend in the device is equal to the desired ageing time. The blend can then be transferred to the scrubber, and contacted with the flue gases.

An amount of washing liquor equal to the amount of alkaline sulfide liquor is bled off, to keep constant the volume of circulating wash liquor.

The recirculating washing liquor should be held at the highest temperature possible during blending and any storage or ageing time, so as to avoid unnecessary heat losses. It is generally desired that the scrubbing be carried out in the region of the dew point of the flue gas, normally within the range from about 50° C. to about 70° C. Hence, unnecessary cooling of the recirculating liquor is to be avoided, because this will necessitate reheating of the liquor to carry out the scrubbing within the optimum temperature range. Moreover, the chemical reactions that take place during ageing are apparently favored at elevated temperatures. Consequently, if it is necessary to cool the washing liquor before contact with the flue gases, this should preferably be effected subsequently to the ageing.

If, for technical reasons relating to the apparatus used, a relatively large quantity of washing liquor is circulated through the system, for example an amount within the range from about 50 to about 100 times larger than the quantity of fresh alkaline sulfide liquor blended with the washing solution, it may be advantageous to blend only a portion of the circulating washing liquid, say from about 50% to about 90%, with the fresh alkaline sulfide liquor, and hold it for ageing, thereby to increase the ageing time for fresh alkaline sulfide solution, since it is the sulfide content of the fresh liquid that must be captured before the liquor can be brought into contact with the waste gases.

The pH of the washing liquor can be controlled easily and automatically within the range from 6 to 7 if the pH of the liquor is determined as soon as the recirculating washing liquor and the fresh alkaline sulfide liquor have been thoroughly blended, preferably less than one minute after mixing, and again after ageing to adjust for any change in pH which may occur during the ageing.

The process of the invention is of particular application to the method described in U.S. Pat. No. 3,532,595, using the flue gas scrubber apparatus described therein. This process has the special advantage of providing hot water which is sufficiently pure to allow its use in pulp washing and/or pulp bleaching processes as a by-product of the flue gas-scrubbing process.

Normally, nozzles are used to control the pH of the washing liquor. To make absorption of sulphur dioxide possible, the pH is controlled to a level to provide good contact between washing liquid and gas and to atomize the liquid, suitably at a pressure of 0.3–3 kg./cm.$^2$, but the liquid can also be atomized by means of rotating rolls or brushes, although a less uniform distribution of droplet size is obtained in this way. Practical tests have proved that when using a large quantity of liquid a relatively low nozzle pressure will be sufficient so that at 3.3 liters of liquid per m.$^3$ gas it is possible to work with 0.3–0.5 kg./cm.$^2$, but at 0.67 liter liquid per m.$^3$ gas a pressure of up to 2–3 kg./cm.$^2$ must be used.

To avoid corrosion in the metallic portions of the washing apparatus it has proved necessary to adopt specific measures to rapidly and completely saturate the inflowing hot gas with water and cool the same down to its dew point. If no such measures are taken, temporary and local drying of washing liquor will cause difficult corrosion on metallic surfaces, for instance nozzle pipes, splash plates and collecting bottoms, even though these be manufactured of high-alloyed acid-resistant steel. It has been proved possible to obtain a rapid saturation of the gas by placing a number nozzles, suitably 10–30 having a relatively high pressure—2–5 kg./cm.$^2$, in immediate connection with the gas inlet in the washing section, and introduce a quantity of liquid through the nozzle corresponding to 0.33–0.83 l. per m.$^3$ gas.

Subsequent to treating the gas with the alkaline washing liquid, it is desirable to separate the major portion of entrained liquid droplets since a certain percentage of salt in the hot water causes corresponding chemical consumption, if the hot water is to be used in pulp bleaching. This droplet separation process can be accomplished in a variety of ways, for instance by using wire mesh separators which function best at a gas velocity of approximately 3 m./s., or conventional impact separators functioning at a gas velocity of 8–12 m./s. in the slots. It is important when installing the drop separator to maintain a good distribution of gas in the flue gas scrubber by dividing the separator up into sections, each having a width of at the most 10% of the total cross section.

Cooling of the gas for the production of hot water can similarly be effected in an apparatus provided with nozzles or with rotating droplet-forming elements. Since it is generally desired to reclaim a large portion of the heat content of the flue gas and at the same time produce hot water at as high a temperature as possible, it is necessary to adopt a multistage cooling process, the water being passed in countercurrent to the flue gas so that the hot water produced can be removed from the section into which the flue gas is led subsequent to the alkali washing process, and the cold water supplied to the section where treatment of the flue gas is terminated.

With respect to the design of horizontal scrubbers, no major difficulties are to be met with when separating the various sections. This can be done by means of vertical walls covering 40% to 60% of the cross section of the scrubber, the water being collected on corresponding surfaces of the scrubber bottom and may be pumped over to the nozzles in adjoining sections.

With respect to vertical scrubber designs, it is necessary to introduce collecting bottoms which communicate with corresponding pumps. These bottoms should be so designed that a good distribution of gas in the apparatus is maintained. This can be achieved either by arranging slots over the whole scrubber area, at a spacing of not above 20% of the area, or by arranging bottoms, not provided with slots, alternately on both sides of the symmetry line of the scrubber so that 40% to 60% of the area is covered, and coordinating these bottoms with banks of nozzles so that the liquid from each nozzle bank passes over the opening in a bottom and is collected on the underlying bottom. The liquid arriving from the washing process contains mainly sodium sulfite together with smaller amounts of sodium thiosulfate and sodium chloride. This solution may suitably be recirculated to the tank in which the melt is dissolved. The content of alkali may be varied within wide limits, 100–5 g./l. $Na_2O$, but for practical reasons more suitably within the limit 30–50 g./l. $Na_2O$.

The temperature of the outgoing scrubber water may, in suitable proportions between gas and liquid load, be raised to a value which lies very close to the dew point of the gas, or usually somewhat over 60° C. The percentages of dissolved salts of the scrubber water normally reach 0.1–0.3 g./l. $SO_2$ and 0.030–0.005 g./l. HCl, and the water can therefore, without further ado, be used for instance in the bleaching process.

The two embodiments of apparatus shown in the drawings of U.S. Pat. No. 3,532,595 are particularly preferred in the application of the process of the instant invention.

The following Examples in the opinion of the inventors represent preferred embodiments of the invention.

EXAMPLE 1

For purposes of comparison, the process of the invention was carried out in parallel with the process described in U.S. Pat. No. 3,532,595, using the apparatus of FIG. 5 thereof, and the procedure of Example 2. The washing liquor had a pH of 7.1. The process of the invention was then applied, using a washing liquor having a pH of about 6.7, but otherwise keeping the treating conditions of the patent, and using the apparatus of FIG. 5.

(a) 50,000 m.$^3$/h. flue gases from combusting waste liquor from a sulfate celluose process including 0.4 g./m.$^3$ solid particles, substantially $Na_2SO_4$ and soot, and 0.05% $SO_2$ and 0.005% HCl, were led at a temperature of 130° C. and a dew point of 64° C. to a horizontal washing plant, in the washing portion of which gas was caused to contact, in countercurrent flow, alkaline washing liquid having a pH of 7.1.

The washing plant comprised a horizontally supported cylinder according to FIG. 5 of No. 3,532,595, having an inner diameter of 4.8 m., wherein the gas is taken through a parallel-epipedic pipe in the one endplate having a width of 3 m. and a height of 4.5 m. The gas was wetted in the wetting device with 300 l./min. alkaline washing liquid, which was injected at a pressure of 3 kp./cm.² through 22 nozzles disposed immediately above the gas intake.

The washing plant was divided into a washing zone and six chambers having 3 m.-high partitions departing alternately from the upper and lower portion of the cylinder. The chambers were disposed in the following manner:

Washing section A, 45 nozzles at 20 l./min. and 3 kg./cm.²
Washing section B, 45 nozzles at 20 l./min. at 3 kg./cm.²
Sedimentation section, no nozzles
Cooling sections:
- C, 45 nozzles at 120 l./min. at 1 kg./cm.²
- D, 45 nozzles at 120 l./min. at 1 kg./cm.²
- E, 45 nozzles at 120. l./min. at 1 kg./cm.²

The last three spray nozzle chamber formed a cooling section for producing hot water. The gas left the scrubber through the other endwall thereof, which wall communicated with a chimney. The washing liquor supplied was green liquor containing $Na_2O$ and sulfide, and having the composition:

| | g./l. $Na_2O$ |
|---|---|
| Sodium carbonate | 95 |
| Sodium sulfide | 33 |
| Sodium sulfate | 2 |
| Total | 130 |

The green liquor was supplied at a rate of 80 liters per minute, providing 10 grams per liter $Na_2O$ and 1.7 grams per liter $S^=$. This was blended with the recirculating washing liquor. The blend recirculated at a rate of 4,000 liters per minute, of which 3920 liters per minute were recirculating liquor, and 80 liters per minute fresh green liquor. A portion equal to that blended in as green liquor was removed, in order to keep the total volume of recirculating liquid constant. The pH of the blend passed to the spray nozzle chambers of the washing section was 7.1. The outgoing flue gases contained 0.005% sulfur dioxide and 0.004% hydrogen sulfide.

The washing liquor had the composition:

| | g./l. |
|---|---|
| $Na_2O$ | 10 |
| $SO_3^=$ | 9 |
| $CO_3^=$ | 2.5 |
| $SO_4^=$ | 2.5 |
| $S_2O_3^=$ | 1.2 |
| $Cl^-$ | 0.9 |
| $S^=$ | 0.2 |

(b) Example 1(a) was repeated, using the same green liquor at the rate of 70 liters per minute, so as to maintain a pH of 6.7 in the washing liquor. The rate of circulation of the blend of washing liquor was 4,000 liters per minute, of which 3930 liters per minute were recirculating liquor.

The washing liquor had the composition:

| | g./l. |
|---|---|
| $Na_2O$ | 9 |
| $SO_3^=$ | 7 |
| $CO_3^=$ | 1 |
| $SO_4^=$ | 2 |
| $S_2O_3^=$ | 2 |
| $Cl^-$ | 0.8 |
| $S^=$ | 0.006 |

The outgoing flue gases contained 0.007% sulfur dioxide and 0.0015% hydrogen sulfide. Thus, by modifying the pH of the washing liquor in this manner, a 63% reduction in hydrogen sulfide emission was obtained.

(c) Example 1(b) was repeated, using the same green liquor at the rate of 70 liters per minute, so as to maintain a pH of 6.7 in the washing liquor. The rate of circulation of the blend of washing liquor was 4,000 liters per minute, of which 3930 liters per minute were recirculating liquor. However, in this case the blend was passed to a storage vessel having a volume of 40 cubic meters, and allowed to age for 10 minutes after blending before being brought into contact with the flue gases. At the end of the 10-minute ageing period, the solution was pumped to the spray nozzles of the washing section, and then had a pH of 6.7.

The blend of washing liquor had the composition:

| | g./l. |
|---|---|
| $Na_2O$ | 9 |
| $SO_3^=$ | 7 |
| $CO_3^=$ | 1 |
| $SO_4^=$ | 2 |
| $S_2O_3^=$ | 2 |
| $Cl^-$ | 0.8 |
| $S^=$ | 0.0007 |

The outgoing flue gases contained 0.007% sulfur dioxide, and 0.00005% hydrogen sulfide. This corresponds to a 99% decrease in the emission of hydrogen sulfide, compared to Example 1(a).

The process of the instant invention can be applied to all types of cellulose pulp manufacturing processes in which a combustible waste liquor is obtained, and which is burned in a manner to generate sulfur dioxide-containing waste or flue gases. Examples of such processes are the cellulose sulfate pulping process and the sodium-based sulfite pulping process. The method can also be applied to semichemical pulping processes in which sulfide-containing absorption solutions are used to produce sulfite-containing cooking liquors. Processes based on calcium and magnesium do not give rise to sulfide-containing absorption liquors, and consequently the process of the present invention is not applied to such processes.

The process of the invention can also be applied using any type of gas-scrubbing apparatus, including not only those described in U.S. Pat. No. 3,532,595, but also those provided with heat exchange means in the conduits through which the washing solutions circulate, but lacking a washing stage for the acid components of the flue gas.

In accordance with the invention, the sulfide-containing alkaline solution used as a raw material for the washing liquor can be in the form of green liquor or white liquor derived from the chemical recovery system of a sulfate plant or sulfite plant, but sodium sulfide-containing solutions obtained from other cellulose pulping processes can also be used in a corresponding manner.

EXAMPLE 2

(a) In an apparatus of the type described in U.S. Pat. No. 2,333,193, employing a type of scrubbing apparatus provided with heat exchange means in the conduits through which the washing solutions circulate, 50,000 normal cubic meters of flue gases obtained when burning waste liquor from a neutral sulfite cellulose pulping process containing 0.2% sulfur dioxide at a temperature of 125° C., and having a dew point of 65° C., were fed each hour through the scrubbing apparatus, in which the gas was contacted in countercurrent flow with an alkaline washing liquor, and simultaneously cooled.

The scrubbing apparatus comprised a cylindrical tower having a diameter of 4.0 meters, and the gas was passed through the bottom of the tower and conducted upwardly through four sections provided with spray nozzles and collecting plates, together with means for recirculating the washing liquor from the lowest collecting plate to the top bank of spray nozzles by way of a heat exchanger. The circulating washing solution was cooled in the heat exchanger from 62° to 20° C., using pure water, which was heated thereby from 5° to 49° C. The gas was discharged from the top of the scrubber through a chimney, and the temperature of the gas leaving the scrubber was found to be 30° C.

The washing liquor was mixed with 40 liters per minute of white liquor extracted from an adjacent sulfate plant, and containing 80 grams per liter $Na_2O$ and 10 grams per liter sulfide, and having the composition:

| | g./l. as $Na_2O$ |
|---|---|
| NaOH | 27 |
| NaSH | -- |
| $Na_2S$ | 12 |
| $Na_2CO_3$ | 6 |
| $Na_2SO_4$ | 0.1 |
| $Na_2SO_3$ | 0.1 |
| $Na_2S_2O_3$ | 0.2 |

The blend of washing liquor thus obtained was then recirculated at a rate of 3,000 liters per minute, of which 2960 liters per minute were recirculated washing liquor. The pH of the blend passed to the top bank of the spray nozzles was 7.2. The blend had the composition:

| | g./l. |
|---|---|
| $Na_2O$ | 15 |
| $SO_3^=$ | 14 |
| $CO_3^=$ | 3.5 |
| $SO_4^=$ | 4 |
| $S_2O_3^=$ | 1.1 |
| $Cl^-$ | 1.0 |
| $S^=$ | 0.2 |

The outgoing flue gases contained 0.03% sulfur dioxide and 0.005% hydrogen sulfide.

(b) The scrubbing conditions were then changed by substituting a washing liquor in accordance with the instant invention, having a pH of about 6.8. This pH was obtained by reducing to 35 liters per minute the amount of the blended white liquor with recirculating liquor. The recirculating washing liquor had a temperature of 62° C. The blend was recirculated at a rate of 3,000 liters per minute, of which 2965 liters per minute represented recirculating washing liquor, and 35 liters per minute white liquor. The blend immediately after mixing passed to a vessel having a volume of 45 cubic meters, and aged therein for 15 minutes. The resulting blend was then pumped to the heat exchanger, in which it was cooled to 20° C., and subsequently passed to the top bank of spray nozzles in the scrubber. The pH at this stage was 6.8. The blend had the composition:

| | g./l. |
|---|---|
| $Na_2O$ | 14 |
| $SO_3^=$ | 12 |
| $CO_3^=$ | 3 |
| $SO_4^=$ | 3.5 |
| $S_2O_3^=$ | 1.5 |
| $Cl^-$ | 2.0 |
| $S^=$ | 0.0001 |

The outgoing flue gases were found to contain 0.035% sulfur dioxide, while the hydrogen sulfide content was 0.0002%. The surplus washing liquor formed as a result of charging white liquor to the system and by condensation of the water vapor given off when cooling the gas, totaling 140 liters per minute, was used for preparing cooking liquor for the neutral sulfite cellulose pulping process, and had a concentration of 20 grams per liter $Na_2O$, mainly in the form of sodium sulfite and sodium bisulfite.

The embodiments of the invention in which an exclusive property or privilege is claimed are defined as follows:

1. In the continuous process for absorbing sulfur dioxide in waste gases from the combustion of cellulose pulping waste liquors by scrubbing the gases with an aqueous washing liquor initially containing sulfide ion, at least part of which is capable of being released as hydrogen sulfide, the improvement which comprises inhibiting the emission of hydrogen sulfide by contacting the gases with an aged washing liquor having a pH within the range from about 6 to about 7, and scrubbing the gases therewith, blending the resulting liquor with an amount of an aqueous alkaline liquor containing sulfide ion to maintain the pH of the washing liquor within the range from about 6 to about 7 and ageing the resulting liquor while maintaining the pH within said range after the scrubbing and before recycling the resulting liquor into contact with additional sulfur dioxide-containing waste gases.

2. The process of claim 1 in which the aqueous alkaline liquor is green liquor.

3. The process of claim 1 in which the aqueous alkaline liquor is white liquor.

4. A process for reducing hydrogen sulfide emission when scrubbing sulfur dioxide-containing gases obtained from the burning of waste liquor from cellulose pulping processes with aqueous washing liquors derived from alkaline liquors containing sulfide ion, which comprises contacting the sulfur dioxide-containing gases with an aqueous washing liquor having a pH within the range from about 6 to about 7 at the time of initial contact, absorbing sulfur dioxide in such liquor, withdrawing the liquor from such contact, blending alkaline aqueous liquor containing sulfide ion with at least a portion of the withdrawn liquor in an amount to adjust the pH of the blend to within the range from about 6 to about 7, and recirculating the blend *after* ageing while having a pH within the said range for contact with an additional portion of sulfur dioxide-containing-gas.

5. A process according to claim 4, in which the alkaline liquor containing sulfide ion is a waste liquor from a semichemical or chemical cellulose pulping process of the sulfite or sulfate type.

6. A process according to claim 4 in which the alkaline liquor containing sulfide ion is a green liquor.

7. A process according to claim 4, in which the alkaline liquor containing sulfide ion is a white liquor.

8. A process according to claim 4, wherein the alkaline liquor is added in an amount to adjust the pH of the blend to within the range from about 6.5 to about 6.8.

9. A process according to claim 4, wherein the blend of alkaline liquor and withdrawn washing liquor are aged at least 2 minutes before recirculating the blend for contact with sulfur dioxide-containing gas.

10. A process according to claim 9, wherein the ageing time is less than 30 minutes.

11. A process according to claim 10, wherein the ageing time is from about 3 to 20 minutes.

12. A process according to claim 9, wherein the temperature of the blend during the ageing is adjusted to the dew point of the incoming waste gas.

References Cited

UNITED STATES PATENTS 3,532,595 10/1970 Arnesjo et al. -------- 423—222

EARL C. THOMAS, Primary Examiner

U.S. Cl. X.R.

423—222; 162—51, 64

PO-1050
(5/69)

UNITED STATES PATENT OFFICE
CERTIFICATE OF CORRECTION

Patent No. 3,842,160 Dated October 15, 1974

Inventor(s) Rolf Carl August Brannland et al.

It is certified that error appears in the above-identified patent and that said Letters Patent are hereby corrected as shown below:

Column 1, line 31, "be", first occurrence, should be --can--; line 34, before "scrubbing", please insert --scrubbers. The--; line 44, "process" should be --processes--.

Column 2, line 3, "G.1." should be --g./l.--; line 5, "$So_3$" should be --$SO_3$--.

Column 3, line 22, formula (1), last portion of formula "$(OH)_2$" should be --$S(OH)_2$--; line 25, formula (3), "$S+HS_2O_3 \rightleftharpoons H_2S_2O_3$" should be --$S+H_2SO_3 \rightleftharpoons H_2S_2O_3$--.

Column 4, line 29, "neglible" should be --negligible--.

Column 5, line 53, after "corrosion", please insert --attack--; line 58, after "number", please insert --of--.

Column 7, line 22, "chamber" should be --chambers--.

Signed and sealed this 27th day of May 1975.

(SEAL)
Attest:

RUTH C. MASON
Attesting Officer

C. MARSHALL DANN
Commissioner of Patents
and Trademarks